O. A. MYGATT.
PRISM GLASS REFLECTOR FOR ARTIFICIAL LIGHTS.
APPLICATION FILED MAR. 24, 1904.
988,488.  Patented Apr. 4, 1911.
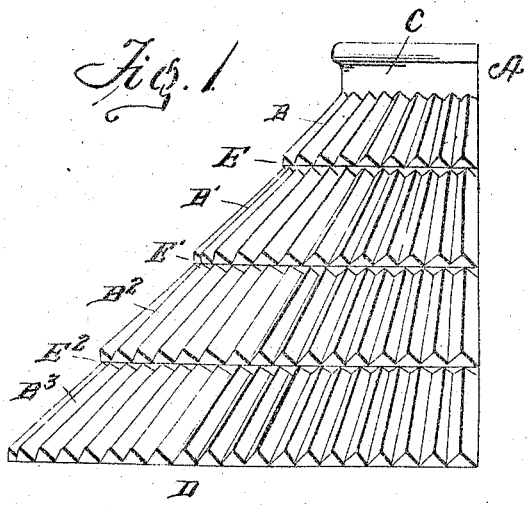
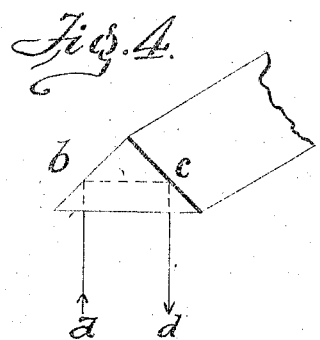
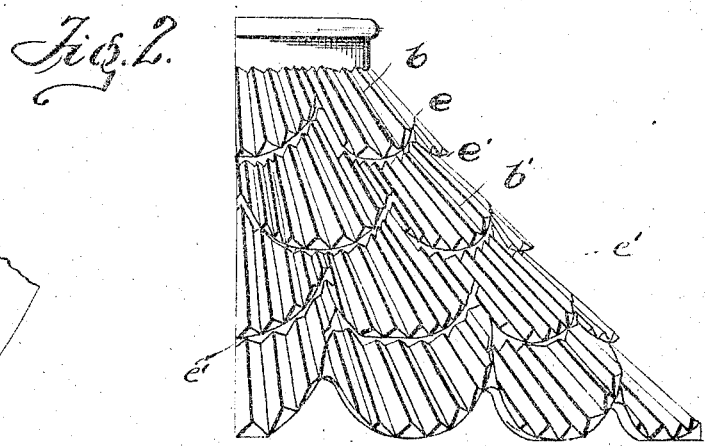
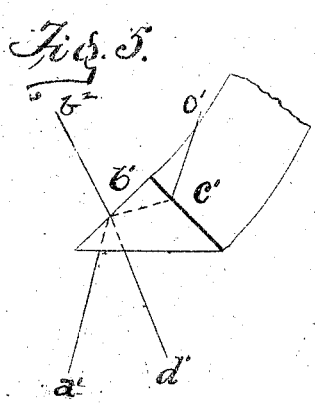
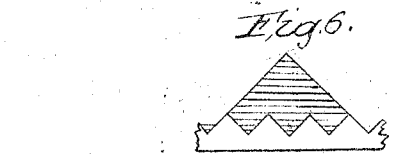
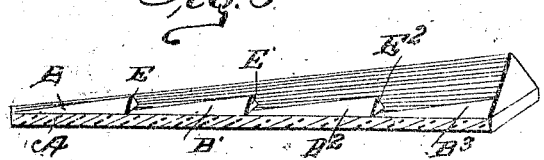
Witnesses
Chas. K. Davis
M. A. Brown
Inventor
O. A. Mygatt
W. A. Bartlett
Attorney

UNITED STATES PATENT OFFICE.

OTIS A. MYGATT, OF NEW YORK, N. Y.

PRISM-GLASS REFLECTOR FOR ARTIFICIAL LIGHTS.

988,488.

Specification of Letters Patent.   Patented Apr. 4, 1911.

Application filed March 24, 1904.   Serial No. 199,721.

*To all whom it may concern:*

Be it known that I, OTIS A. MYGATT, a citizen of the United States, residing at New York, in the county of New York and State of New York, have invented certain new and useful Improvements in Prism-Glass Reflectors for Artificial Lights, of which the following is a specification.

This invention relates to prism glass reflectors, for artificial lights.

The object of the invention is to produce a prism glass reflector of minimum weight; also to embody in the reflector decorative effects without detracting to any considerable extent from the efficiency of the reflector.

In my Design Patents Nos. 32,685, and 32,686, of May 22, 1900 I illustrate prism glass reflectors of substantially the maximum efficiency, assuming that the prisms are of the character illustrated in detail in Figure 5 and in elevation in the upper part of Figs. 1 and 3 of my Patent No. 736,535, of Aug. 18, 1903. In my Design Patents numbered 35,755, 35,756, and 35,757, of Feb. 18, 1902, I show reflectors with external prisms of the same general character, but arranged spirally on the glass reflectors. This spiral arrangement of prisms is by some considered more ornamental than the radial arrangement of prisms in the patents first above referred to, but is less efficient for the purpose of reflection of light in a downward direction, for reasons I will explain hereinafter. In all the constructions of prism glass reflectors above referred to, the reflectors are of greater circumference at the base or lower part than at the apex or upper part, being hollow frustums of cones, spheres or spheroids, or combinations of such geometrical forms. In most of the prismatic reflectors heretofore constructed by me each prism was constructed to extend from a point at or near the center or smallest part of the reflector to the base or part of greatest diameter thereof, either in lunar or in spiral form. In either case, as a prism approached the periphery of the reflector it necessarily increased in height and breadth, in order to retain its proper angular and reflective relation to the beams or lines of light emanating within the reflector. This increase in the width and height of the prisms is objectionable for two important reasons. The entire reflector is thereby made much heavier, increasing the cost and increasing the cost of fixtures to hold it. The reflector is also rendered less efficient, since thick glass absorbs light in proportion to its thickness, thereby neutralizing its reflective action to such extent.

The present invention largely reduces the weight of prismatic glass reflectors, thereby reducing cost, providing for greater efficiency, and also affording large opportunity for ornamental and decorative effects in prism glass reflectors for artificial lights. The ribs or prisms vary in number in adjacent series within a given area. It is this characteristic, among others, which gives the glassware the qualities set forth in the specification.

Fig. 1 is a side elevation of part of a prismatic reflector, illustrating the principles of my invention. Fig. 2 is a similar elevation of part of a modified and decorative reflector involving like principles. Fig. 3 is a diagram illustrating a section of a prismatic glass reflector, showing a dark or shaded surface intended to illustrate the area or elevation of a prism of the construction shown in my patent first referred to, and a series of light surfaces intended to illustrate the area or elevation of a series of prisms of substantially equal or greater reflective power according to the present invention. Fig. 4 is a perspective diagram of a prism which I call a double reflective prism, indicating the course of a single ray of light. Fig. 5 is a perspective diagram of a spirally arranged double reflective prism, showing direction of some light rays which are not reflected from such a prism. Fig. 6 is an end view in diagrammatic illustration of one of a lower series of prisms, showing in shade lines the triangular area of the first prism of the first series, if produced in symmetrical form.

In prismatic glass reflectors the most effective reflecting faces of the prisms are those faces against which the light rays which enter the reflector from within, strike the outer face of the prism at an angle of 45 degrees, as in the line $a$, Fig. 4. Such a ray is reflected by the surface $b$, in the direction of $c$, forming at $b$ an angle of 90 degrees. At $c$ the light ray again strikes a surface inclined at an angle of 45 degrees to the line of its movement or direction. Again or a second time the ray is reflected at an angle of 90 degrees in the direction of $d$. This double reflection of some light rays will take place if the prisms are not inclined exactly at angles of 45 degrees, the limit of effective reflection being some seven or eight degrees on either side of the 45 degree inclination from the line $a$. In the spirally arranged prisms on the same form of reflector, some of the light rays as $a'$ must encounter the reflecting surface as $b'$ at an angle greater or less than 45 degrees. A part of the ray passes through in the direction $b^2$, and a part is reflected in the direction $d'$, while a part is reflected across the prism to the surface $e'$, and passes out in the direction $o'$. It is obviously impossible to illustrate the direction of a very large number of light rays in a diagram. The illustration applies to many of the rays. But from large experience I am convinced that the most effective prismatic glass reflectors are those in which the prisms are arranged with their longer axes on radial lines on the outer face of a reflector surrounding the light. Nevertheless my present invention is equally adaptable to the spiral or other arrangement of prisms, with an equal saving of weight.

In Fig. 1, let A indicate a broken side view of one of my improved reflectors. The reflector shown is of the well known conical form, but may be arched and may be either open or closed at the top. Prisms B are of the character shown in the patents first referred to, are integral with the body A, and reflect light rays from within in the manner illustrated in Fig. 4 herein. But instead of extending from the neck C of the reflector to the rim D, as in the patents and designs referred to, and as represented in the shaded diagram, Fig. 3, these prisms B terminate along the line E. A second series of prisms B' begins below the line E. At the lower end of the prisms B there is a reduction in thickness, or downward step from the outer surface of prisms B to the surface of the next lower series of prisms B'. As the reflector body A is here larger in diameter, a greater number of prisms of the width of those B will be required to surround the reflector. These prisms B', as shown in Fig. 3, will be of considerably less thickness than would be the extension of prisms B in the same direction, and the shaded lines above B' in Fig. 3 indicate the saving in the height of prisms, if the desirable reflective angle of 45 degrees is preserved. The prisms B' terminate along the line E', and a new series B² begins below that line, and these prisms extend to E². Thus at the lower extremity of any prism there is a reduction in height, or step down, to the outer surface of the prism in the next series toward the periphery of the reflector. A similar arrangement of prisms B³ is made at the lower side of the horizontal line E². The diagram, Fig. 3, illustrates the series, and graphically shows the great difference in thickness between prisms made continuous, or prisms in separate series to cover the outer surface of a cone.

Fig. 6 gives a sectional or end view, the shaded surface indicating the saving in height and weight of glass by employing numerous small prisms, with the same reflective angle, over a single reflecting prism. The light is also reflected with less absorption, from the thinner glass, of the smaller prisms.

Not only is there a great saving in weight by making the prismatic reflectors in short series of small height, but great advantage is afforded in the way of decorative effects.

I have been able to make reflectors of pressed prismatic glass which reflect as much as 85 per cent. of the quantity of light received, back into the reflector, and out at the mouth thereof. This I believe to be about the maximum capacity of pressed prismatic glass, and is rather more than is desirable in most cases, as the reflector is much more attractive in appearance if some light passes through it, and it is also generally desirable that bodies above or behind the reflector should receive some illumination. By breaking up the prisms into series of smaller prisms, I am able to save the weight of the large sectional area of prisms and save the light absorbed thereby. This enables me to pass a larger quantity of light through the reflector for decorative effects, while maintaining substantially as much light reflection as heretofore.

In Fig. 2 the prisms $b$, $b'$, &c., are in series terminating on lines $e$, $e'$, &c. The outer surface of the reflector will thus present an appearance of scales, each scale having longitudinal prisms forming its surface. At the lower end of each prism, that is, the end nearest the periphery of the reflector, there is a step down or reduction in height of the outer surface of the glass, to the beginning of the next prism toward the periphery of the reflector. As clearly seen in Figs. 1 and 2, the lower series of prisms do not necessarily form direct continuations of the prisms of upper series, but the prisms of each lower series begin at a lower plane, with reference to the body of glass inside the prisms, than the lower terminals of prisms of upper series. That is, there is a step down at the lower end of any prism, to the beginning of the next prism toward the periphery, whether the axes of the prisms follow the same radial lines or not. The terminal lines or planes $e$, $e'$ may be at such angles as to permit the passage of more or less light. Thus very brilliant decorative effects may be attained.

As seen clearly at the right hand side in Fig. 2, the lower ends of prisms of an upper series of prisms project from the body of the reflector beyond the upper ends of the prisms of a lower series. It will also be seen in the same figure that the prisms vary in length, and are not limited as to their length.

Fig. 3 illustrates the interior of the shade A as smooth. This is a common form of construction. As a matter of fact my prismatic construction of the exterior of a reflector is applicable to reflectors with interiors of other than smooth surface, and except in specific claims, my claims are intended to apply to reflectors having any form of interior construction.

It is obviously impossible to describe and illustrate all the various modifications which may be made, so far as arrangement of prisms on the outer surface of reflectors is concerned. The salient feature of the present invention is that the prisms have their longer axes in a direction generally radial to the body of the reflector, and that the prisms instead of extending from the central portion to the periphery of the reflector, (as has generally been the case heretofore) are broken up into short series of small prisms extending in the same general direction.

The prisms may be arranged so as to show almost any desired ornamental pattern on the outer surface of the reflector. The number of prisms necessary to surround the reflector must of course increase with the diameter of the reflector, unless the prisms are increased in size with the disadvantages hereinbefore stated.

I am aware that prior to my present application for patent, prismatic glass reflectors had been known in which prisms beginning near the top of the frustum had extended some distance down the upper outer surface of the frustum, and had been interrupted by ornamental forms or spaces, and then again extended, either on the original lines or in lines parallel therewith. But such a construction does not lighten the structure to any considerable extent, as the lower prisms are practically continuations of the upper prisms, and to maintain the proper reflective angle must increase in thickness and height, as if the prisms had not been interrupted. I make my prisms as separate series, and when the prisms of a series reach a moderate height and thickness, that series ceases, and a new series begins, of smaller size than the lower ends of the first series, and necessarily greater in number, if the entire surface of the reflector is covered with prisms. The ribs or prisms of each series are offset or out of line with the ribs or prisms of adjacent series. In other words, the glass body is provided with a plurality of series of substantially parallel ribs, the ribs of the adjacent series being offset with respect to one another.

What I claim is:

1. A glass reflector for artificial lights having its exterior provided with prisms arranged in series with their longer axes extending in a generally radial direction, the prisms of each series increasing in number as the diameter of the reflector increases.

2. A glass reflector for artificial lights having its exterior provided with prisms arranged in series with their edges in contact, the longer axes of the prisms extending in a generally radial direction, the prisms of the series toward the periphery of the reflector increasing in number, over the series above.

3. A glass reflector for artificial lights having its exterior provided with prisms arranged in series, the axes of the prisms extending in a generally radial direction, and prisms of certain of the series varying in length.

4. A shade reflector of glass, having on its outer surface reflecting prisms arranged in series, the longer axes of the prisms extending in a generally radial direction, certain of the series being composed of prisms of unequal length, and terminating in lines other than circumferential lines.

5. A reflector composed of a single piece of glass, having its outer surface substantially covered with reflecting prisms arranged in series, a prism of a lower series having a smaller projection from the body of the reflector at its upper end than the projection of the lower end of a prism in the series above it.

6. A reflector composed of a single piece of prismatic glass, the outer surface of said reflector being substantially covered with reflecting prisms arranged in series, with the longer axes of the prisms extending in a generally radial direction on the reflector, the prisms of one series being raised in step-like formation above those of the adjacent series.

7. A reflector composed of a single piece of glass, the inside of said reflector being smooth, the outer surface of said reflector being substantially covered with series of integral prisms having their longer axes extending in generally radial directions with reference to the body of the reflector and calculated to reflect the light rays back into the reflector and out at the open mouth thereof, those of one series being raised in step-like formation above those of the adjacent series.

8. A reflector composed of a single piece of glass having a smooth inside and an exterior surface substantially covered with series of light-reflecting prisms, the different series being superimposed relatively above one another in step-like formation.

9. A reflector having a series of reflecting prisms disposed along its outer surface in step-like formation, a portion of the prisms of a series being of different lengths from other prisms of the same series.

10. A reflector having a series of reflecting prisms disposed along its outer surface in step-like formation, prisms of one series being of different lengths from prisms of another series.

11. A reflector composed of a single piece of glass having its outer surface substantially covered with series of reflecting prisms of various lengths, the lower ends of the prisms of an upper series projecting from the body of the reflector in step-like form beyond the upper ends of prisms of an adjacent lower series.

12. A shade and reflector composed of a single piece of glass and having a neck for engaging the walls of the electric bulb or a chimney, the inside of said reflector being smooth, the outer surface of said reflector being substantially covered with series of integral prisms calculated to reflect the light rays back into the reflector and out at the open mouth thereof, those of one series being raised in step like formation above those of the adjacent series, substantially as set forth.

13. A reflector having series of reflecting prisms disposed along its outer surface, those of one series being disposed along a curved surface and removed a suitable distance from the surface of disposition of the next adjacent series, substantially as set forth.

14. A reflector or shade having thereon a plurality of substantially parallel ribs arranged in upper and lower series, the upper ends of the ribs of a lower series being smaller than the lower ends of the ribs of an upper series.

15. A reflector or shade having thereon a plurality of adjacent series of substantially parallel prisms reflective of light, the prisms varying in number in adjacent series within a given area.

16. A glass body provided with a plurality of series of substantially parallel ribs reflective and transmissive of light, the ribs of adjacent series being offset to one another.

17. A glass body provided with a plurality of series of substantially parallel ribs reflective of light, the ribs of adjacent series varying in number within a given area, and offset to one another, and areas interposed between said series transmissive of light.

18. A glass body provided with a plurality of series of substantially parallel ribs reflective of light, the ribs of adjacent series being offset with respect to one another.

19. A reflector or shade having thereon a plurality of substantially parallel ribs of gradually increasing size arranged in upper and lower series, the upper ends of the ribs of a lower series being smaller than the lower ends of the ribs of an upper series.

20. A glass body provided with a plurality of substantially parallel reflecting prisms of gradually increasing size arranged in upper and lower series, the upper ends of the prisms of a lower series being smaller than the lower ends of the prisms of an upper series.

21. A glass body having thereon a plurality of substantially parallel prisms arranged in upper and lower series, the upper ends of the prisms of a lower series being smaller and offset to the lower ends of the prisms of an upper series.

In testimony whereof I affix my signature in presence of two witnesses.

OTIS A. MYGATT.

Witnesses:
H. E. NASON,
A. A. ERNST.